United States Patent
Sato

[11] Patent Number: 5,103,776
[45] Date of Patent: Apr. 14, 1992

[54] DIESEL ENGINE

[75] Inventor: Yoshihiko Sato, Fujisawa, Japan

[73] Assignee: Isuzu Motors Limited, Tokyo, Japan

[21] Appl. No.: 720,085

[22] Filed: Jun. 24, 1991

[30] Foreign Application Priority Data

Jun. 29, 1990 [JP] Japan .................. 2-173154

[51] Int. Cl.⁵ .................................. F02B 19/00
[52] U.S. Cl. .......................... 123/261; 123/256; 123/276
[58] Field of Search ............ 123/261, 256, 276, 263, 123/280

[56] References Cited

U.S. PATENT DOCUMENTS

| | | | |
|---|---|---|---|
| 2,991,768 | 7/1961 | Witzky | 123/256 |
| 3,703,886 | 11/1972 | Witzky | 123/256 |
| 4,128,092 | 12/1978 | Yokota et al. | 123/256 |
| 4,161,927 | 7/1979 | Yagi et al. | 123/256 |
| 4,175,531 | 11/1979 | Tanahashi | 123/256 |
| 4,175,533 | 11/1979 | Goto et al. | 123/256 |
| 4,686,941 | 8/1987 | Ariga | 123/256 |
| 4,742,805 | 5/1988 | Matsushita et al. | 123/256 |
| 4,744,341 | 5/1988 | Harayama et al. | 123/256 |

Primary Examiner—Raymond A. Nelli
Attorney, Agent, or Firm—Dykema Gossett

[57] ABSTRACT

The diesel engine includes a first combustion chamber defined by a recess in a piston top and a projection formed in the first combustion chamber. The projection stands on a bottom wall of the first combustion chamber. A second combustion chamber is formed inside the projection. A fuel introduction opening is formed at a top of the projection to allow fuel to come into the second combustion chamber and combustion gas exit openings are formed in a side of the projection to allow gases produced upon combustion in the second combustion chamber to go out of the second combustion chamber and enter the first combustion chamber. A fuel injection nozzle injects fuel into the first combustion chamber before the top dead center of the piston. Swirl and squish are produced in the first combustion chamber and make turbulence of fuel and air in the first combustion chamber. Before the swirl and squish are attenuated, the injection nozzle also spouts the fuel into the second combustion chamber to cause another combustion in the second combustion chamber. Gases produced upon the combustion in the second combustion chamber enter the first combustion chamber to help and maintain the turbulence in the first combustion chamber. Therefore, the turbulence is maintained throughout the combustion process in the first combustion chamber.

11 Claims, 2 Drawing Sheets

DIESEL ENGINE

BACKGROUND OF THE INVENTION

1. Technical Field

The present invention relates to a diesel engine and more particularly a diesel engine having two combustion chambers respectively formed in a piston and communicating with each other.

2. Background Art

Various type of diesel engines have been proposed in the past. One is a diesel engine which has only one combustion chamber. Another is a diesel engine which has two combustion chambers. In both type of diesel engines, fuel is injected into the combustion chamber and self-ignition takes place therein, thereby causing combustion. The combustion process of the diesel engine is generally divided into an initial combustion process and a diffuse combustion process. The diffuse combustion process following the initial combustion process.

In the former type of diesel engines, the combustion chamber is generally formed in a top surface of a piston and fuel is injected into the combustion chamber. In the latter type of diesel engines, a main combustion chamber is formed in the top surface of the piston and another combustion chamber (which may be called a swirl chamber, an initial combustion chamber or an auxiliary combustion chamber) is formed in a cylinder head of an engine. These two combustion chambers communicate with each other by a passage formed in the cylinder head.

The one-combustion-chamber-type of diesel engine has an advantage over the two-combustion-chamber-type diesel engine in fuel consumption rate since the former does not need the passage in the cylinder head or since the passage connecting the two chambers creates a throttling loss and deteriorates the fuel consumption rate. On the other hand, the former has a disadvantage as compared with the latter in smoke (black smoke or soot) since swirl flow and squish flow produced in the combustion chamber are attenuated before and during the diffuse combustion, i.e., the former type of engines discharge a large amount of smoke or soot.

Meanwhile, there is a patent application which proposes a modified version of the two-combustion-chamber-type diesel engine (Japanese Patent Application No. 62-72433, published May 9, 1987 and owned by Fuji Heavy Industries Ltd.). FIG. 1 of the accompanying drawings shows this proposal. As illustrated in this figure, a combustion chamber 107 is formed in a top surface of a piston 103 and a swirl chamber 109 is also formed in the piston top surface. The swirl chamber 109 has a volume smaller than the main combustion chamber 107. These chambers 107 and 109 communicate with each other by a passage 111 extending from a lateral wall of the combustion chamber 107 to a lateral wall of the swirl chamber 109. The chambers 107 and 109 are also connected with each other by another passage 112 extending from a bottom of the combustion chamber 107 to the bottom of the swirl chamber 109. The second passage 112 is called a "gas injection opening" in the above patent application. Fuel is supplied from an injection nozzle 113 mounted in a cylinder head 102. The injection nozzle 113 has a larger nozzle hole 115 and a smaller nozzle hole 116. Fuel is directed into the combustion chamber 107 from the larger nozzle hole 115 and simultaneously into the swirl chamber 109 from the smaller nozzle hole 116 through the first passage 111.

In this proposal, however, fuel is injected into the combustion chambers 107 and 109 at the same time (claim 1, and specification, page 5, third paragraph, page 7, second paragraph, page 8, first paragraph of the above Japanese patent application). If the fuel is supplied to the two chambers simultaneously, combustion takes place in the smaller chamber 109 earlier than in the larger chamber 107 in most cases. Thus, gases flowing into the main combustion chamber 107 from the swirl chamber 109 can make turbulence of fuel, air and flame as well as soot in the main combustion chamber 107 at an early stage of combustion in the main combustion chamber 107. However, these gases are eventually weakened and therefore cannot maintain turbulence of air, fuel, flame and soot at a late stage of combustion in the main combustion chamber 107. Of course, swirl flow and squish flow may help make the turbulence in the main chamber 107, but these flows are also weakened gradually and little influence remains at the late stage of combustion.

Meanwhile, in the illustration, 101 designates a diesel engine, 104 an intake passage, 105 an intake valve, 106 a cylinder liner, 110 a hot plug, 114 an injection nozzle tip and 117 a connecting rod.

SUMMARY OF THE INVENTION

An object of the present invention is to provide a diesel engine which can maintain turbulence throughout combustion process in a main combustion chamber. In other words, the present invention maintains the turbulence flow in the main combustion chamber even after swirl flow and/or squish flow are/is attenuated in the main combustion chamber.

According to one aspect of the present invention, there is provided a diesel engine characterized in that a first combustion chamber (main combustion chamber) is formed in a top surface of a piston, that a projection is formed in the first combustion chamber such that the projection stands on a bottom wall of the first combustion chamber, that a second combustion chamber is formed in the projection, that a fuel introduction opening is formed at a top of the projection to allow fuel to come into the second combustion chamber, that combustion gas exit openings are formed in a side of the projection to allow gases produced upon combustion in the second combustion chamber to go out of the second combustion chamber and enter the first combustion chamber as turbulence flow in the first combustion chamber, that a fuel injection nozzle which has first nozzle holes and a second nozzle hole is provided such that fuel is injected into the first combustion chamber from the first nozzle holes and into the second combustion chamber from the second nozzle hole, and that the fuel is injected into the second combustion chamber in a manner such that sufficient turbulence flow is maintained in the first combustion chamber throughout combustion process in the first combustion chamber.

External air is sucked into the first combustion chamber at an intake stroke of the piston and flows circularly or horizontally ("horizontally" in this description only means "in the right and left direction in the drawing") along the lateral wall of the first combustion chamber and the lateral portion of the second combustion chamber. At the end of a compression stroke of the piston, air which exists near the piston top (or near an entrance of the first combustion chamber) is forced in a radial inward direction and enters the first combustion chamber thereby flowing vertically along the lateral wall of the first combustion chamber. Thus, squish flow is produced along the projection in the first combustion chamber and swirl flow is produced along the lateral wall of the first combustion chamber. The first nozzle holes of the fuel injection nozzle are opened just before the top dead center of the compression stroke and fuel is directed to the lateral wall of the first combustion chamber. Then, the fuel is vaporized and merges with the swirl flow and the squish flow thereby becoming mixture of fuel and air and dispersing in the first combustion chamber. As self-ignition occurs on the mixture, the flame is built in the first combustion chamber. Thus, temperature in the first combustion chamber is raised and the projection is heated. This is referred to as "initial combustion process" or "early stage of combustion" in this particular specification (However, the initial combustion is not exactly the same as the early stage of combustion. "Early stage of combustion indicates a combustion process in which the swirl and the squish can maintain the turbulence in the first combustion chamber. "Initial combustion process" may be identical to "early stage of combustion in certain cases.). After a certain time delay from the fuel injection from the first nozzle holes, the second nozzle hole is opened and fuel is introduced into the second combustion chamber so that another combustion occurs in the second combustion chamber. Since the second combustion chamber or the projection is already heated by combustion heat of the first combustion chamber, the combustion in the second combustion chamber occurs instantly and gases produced upon this combustion flow into the first combustion chamber through the combustion gas exit openings at a considerably high speed, thereby making turbulence of the flame, remaining air and fuel as well as soot produced upon the initial combustion in the first combustion chamber. Consequently, the combustion gas, the remaining air and fuel, and the soots are mixed with each other and the soot is burned in the first combustion chamber. Thus, a less amount of smoke (soot) is expelled from the engine. The fuel is injected to the second combustion chamber in a manner such that the combustion gas of the second combustion chamber reaches the first combustion chamber before the swirl flow and the squish flow in the first combustion chamber are attenuated. If the combustion process is divided into the initial combustion process and a diffuse combustion process, the fuel is injected to the second combustion chamber after the diffuse combustion starts in the first combustion chamber. The fuel injection nozzle may be a so-called multi-hole pintaux nozzle which is accompanied with a nozzle holder having two different opening pressure. The fuel may be injected to the second combustion chamber before the diffuse combustion starts in the first combustion chamber.

According to the above-described diesel engine, a less amount of smoke is discharged from the engine and the fuel consumption rate is improved. In addition, the diesel engine has two combustion chambers but requires only one injection nozzle so that cost reduction is realized as compared with a diesel engine having two injection nozzles.

DESCRIPTION OF THE PREFERRED EMBODIMENTS

Now, a preferred embodiment of the present invention will be described with respect to FIGS. 2 and 3 of the accompanying drawings.

Figure 1:
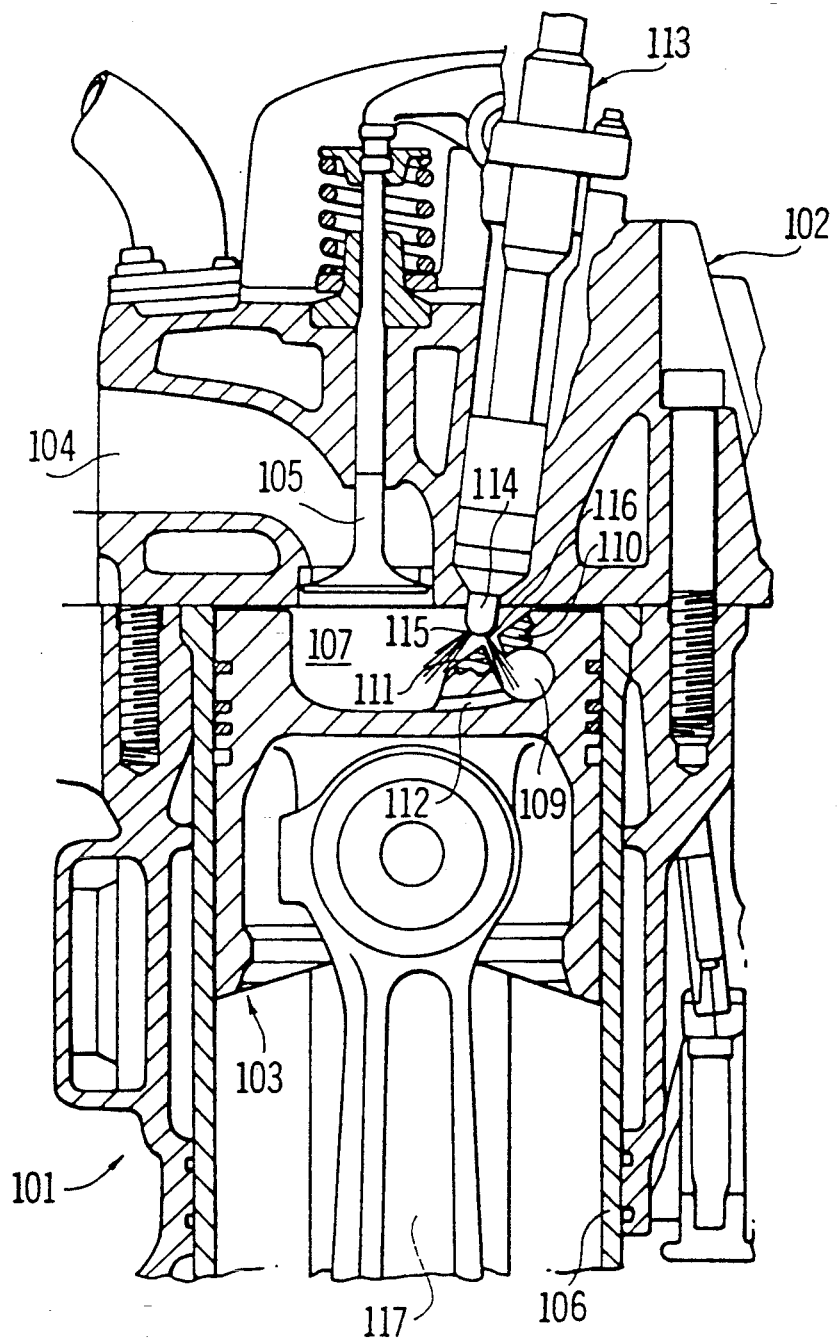
FIG. 1 is a sectional view of a conventional diesel engine.
Figure 2:
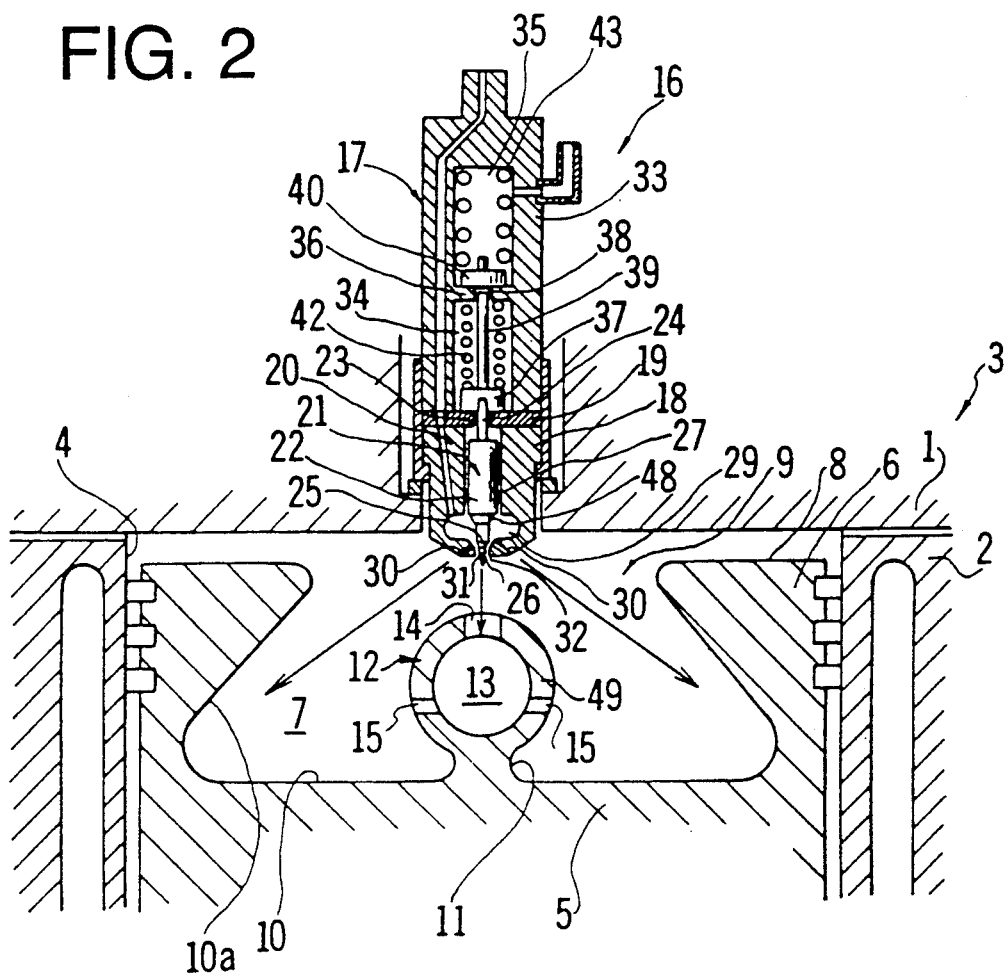
FIG. 2 is a sectional view of a diesel engine according to the present invention.
Figure 3:
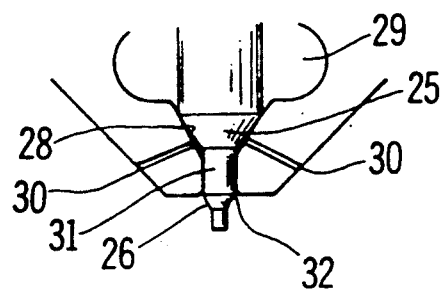
FIG. 3 is a sectional view of a tip of a injection nozzle of FIG. 2.

Referring to FIG. 2, a piston 5 is inserted in a cylinder 4 defined by a cylinder body 2 of an engine 3 such that the piston 5 can move reciprocatively in the cylinder 4. A first combustion chamber 7 is formed in a top portion 6 of the piston 5. Fuel is injected into the first combustion chamber 7 before the end of compression stroke of the piston 5. The fuel is vaporized in the first combustion chamber 7 and in turn self combustion takes place therein.

The first combustion chamber 7 is defined by a recess formed in the top portion 6 of the piston 5. A center axis of the first combustion chamber coincides with a center axis of the piston 5. The first combustion chamber 7 has a truncated conical shape in vertical cross section ("vertical" in this description only indicates the up and down direction in the drawing) so that the top surface 8 of the piston 5 defines a lip portion at an entrance of the first combustion chamber 7. The lip portion creates a strong squish flow at the compression stroke of the piston 5. The first combustion chamber 7 has a radially inwardly inclined lateral wall 10a and a flat bottom wall 10. The inclined lateral wall 10a creates a strong swirl flow in the first combustion chamber.

A projection 12 is formed on the bottom wall 10 of the first combustion chamber 7. The projection 12 stands in the axial direction of the piston 5. The projection 12 includes a base 11 and a sphere 49. The base 11 and the sphere 49 are formed integrally. The base 11 is shaped like a solid cylinder and its diameter is smaller than a diameter of the sphere 49. A second combustion chamber 13 is formed in the sphere 49 of the projection 12. Thus, the second combustion chamber 13 is substantially isolated from the first combustion chamber 7. The projection 12 has a single opening 14 at the top thereof and a plurality of openings 15 at the side thereof. The fuel is introduced into the fuel introduction opening 14 and combustion takes place in the second combustion chamber 13. Gases produced upon the combustion in the second combustion chamber 13 are forced into the first combustion chamber 7 from the second combustion chamber 13 through the combustion gas exit openings 15. The combustion gas exit openings 15 are formed circumferentially with certain intervals. The combustion gas exit openings 15 extend horizontally in a lower half of the sphere 49. The fuel introduction opening 14 extends vertically and the center of the fuel introduction opening 14 coincides with the center axis of the piston 5.

A fuel injection nozzle 16 is mounted in a cylinder head 1 of the engine 3 in the axial direction of the piston 5. The fuel injection nozzle 16 spouts the fuel into the first combustion chamber 7 just before the top dead center of the piston 5. The fuel injection nozzle 16 also spouts the fuel into the second combustion chamber 13 with a certain delay from the fuel injection to the first combustion chamber 7. The fuel injection to the second combustion chamber 13 starts after diffuse combustion starts in the first combustion chamber 7.

The fuel injection nozzle 16 includes a nozzle body 17, a nozzle holder 18 and a retainer element 19. The nozzle body 17 includes a body 20 and a needle valve 21 is movably housed in the body 20. The needle valve 21 has a main stem portion (22 and 48) and a tapered tip portion (25, 31 and 26). A lower end of the main stem portion is tapered to form a pressure receiving face (a first tapered portion) 48. The tapered tip portion includes a second tapered portion 25, a stem portion 31 and a throttle portion (a third tapered portion) 26. Thus, the needle valve 21 has three tapered faces 48, 25 and 26.

The push rod 24 has a smaller diameter than the main body 22. The retainer element 19 has an opening 23 at its center. The push rod 24 extends upward from the top of the main body 22 and fits in the opening 23 of the retainer element 19. The top end or free end of the push rod 24 projects from the retainer element 19.

The nozzle body 20 has a cylindrical hollow part 27 in its approximate upper half and a fuel chamber 29 in its approximate lower half. The fuel chamber 29 has an elliptic cross section in the vertical direction and has a circular cross section in the horizontal direction. The circular cross section of the fuel chamber 29 is larger than the circular horizontal cross section of the cylindrical hollow part 27. The main stem 22 of the needle valve 21 slidably fits in the cylindrical hollow part 27. At the bottom of the fuel chamber 29, there is formed a valve seat 28. The second tapered face 25 seats on the valve seat 28 when no or small pressure acts on the pressure receiving face 48. Nozzle holes 30 and 32 are formed in and just below the valve seat 28 respectively. Specifically, the first nozzle holes 30 are bored in the valve seat 28 in the circumferential direction of the needle valve 21 with intervals. Each first nozzle hole 30 extends at some angle with respect to the center axis of the nozzle 16 such that fuel is injected through the first nozzle holes 30 toward the lateral wall 10a of the first combustion chamber 7. The second nozzle hole 32 extends from the bottom of the valve seat 28 in the axial direction of the nozzle 16 such that fuel injected through the second nozzle hole 32 enters the second combustion chamber 13. When the second tapered face 25 seats on the valve seat 28, the fuel chamber 29 does not communicate with the nozzle holes 30 and 32 so that no fuel comes out from the injection nozzle 16.

The nozzle holder 18 has two chambers 34 and 35. These chambers 34 and 35 respectively house springs 42 and 34. The spring chamber 34 is separated from the spring chamber 35 in the vertical direction by a second retainer portion 36. The second retainer 36 has an opening 38 at its center. A second push rod 39 which has a piston 37 at its bottom is housed in the lower spring chamber 34. A spring (a first return spring) 42 in the lower spring chamber 34 seats on the piston 37 and the top of the spring 42 is supported by the second retainer 36. This piston 37 seats on the first retainer 19. The piston 37 has a recess 41 at its bottom to receive the top of the push rod 24. Thus, the first return spring 42 biases the needle valve 21 downward. The second push rod 39 extends in the opening 38 of the second retainer 36 but does not project into the upper spring chamber 35 when the needle valve 21 is in its rest position. A second piston 40 is provided in the upper spring chamber 35 and seats on the second retainer 36. There is a clearance between the bottom of the second piston 40 and the second push rod 39. A spring (a second return spring) 43 in the upper spring chamber 35 seats on the second piston 40. Thus, the second return spring 43 biases the second piston 40 downward but does not bias the needle valve 21 when no or only a small fuel pressure acts on the first tapered face 48 since there is a clearance between the second piston 40 and the second push rod 39. As the fuel pressure in the pressure chamber 29 rises to a first predetermined value $P_1$, the needle valve 21 starts moving up and the push rod 39 is raised. Consequently, the push rod 39 contacts the second piston 40. As the pressure in the fuel chamber 29 rises further to a value $P_2$, the push rod 39 pushes the second piston 40 upward. The value $P_1$ is set to be smaller than $P_2$. The value $P_1$ may be called "pre-lift or initial-lift pressure" and the value $P_2$ may be called "needle valve total lift pressure". The clearance is set to be smaller than the height of the third stem portion 31 of the needle valve 21.

A normal injection nozzle may be used as the fuel injection nozzle 16. The second nozzle hole 32 is opened after the first nozzle holes 31 are opened since the first nozzle holes 31 are opened as the needle valve 21 leaves the valve seat 28 but the third stem 31 of the needle valve 21 still closes the second nozzle hole 32 for a while even after the needle valve 21 leaves the valve seat 28, as shown in FIG. 3. Therefore, the first nozzle openings 30 are opened during the early stage of combustion in the first combustion chamber 7 or during the initial combustion process in the first combustion chamber 7 and the second nozzle hole 31 is opened in addition to the first nozzle holes 30 during the late stage of combustion or during the diffuse combustion process in the first combustion chamber 7. From another view point, the first nozzle holes 30 are opened when the pressure in the fuel chamber 92 exceeds the valve $P_1$ and the second nozzle hole 32 is opened when the pressure exceeds the value $P_2$.

The length of the third stem 31 is set to be substantially equal to the length of the second nozzle hole 32, and the third tapered face is formed at the bottom of the third stem 31. The second tapered portion 25 contacts the valve seat 28 at its upper portion, as illustrated in FIG. 3. A diameter of the throttle portion 32 of the nozzle 16 is larger than a diameter of the third stem 31 of the needle valve 21, but the difference between these diameters is very small since the fuel leaks through clearance between the third stem 31 and the throttle portion 32 if the diameter difference is relatively large, i.e., if the diameter difference is relatively large, the fuel is spouted and the second nozzle hole 32 becomes "opened" as the first nozzle opening 30 are opened.

The operation of the embodiment will be now explained.

As air is sucked into the cylinder 4 through a helical intake port (not shown), the air enters the first combustion chamber 7 with an intensity determined in accordance with a ratio of a diameter of the cylinder 4 to a diameter of the entrance opening of the first combustion chamber 7 and the air flows circularly or horizontally along the lateral wall 10a of the first combustion chamber 7 and the projection 12. The air existing near the entrance of the first combustion chamber 7 is forced into the first combustion chamber 7 at the end of the compression stroke of the piston 5 since the clearance between the cylinder head 1 and the top surface 8 of the piston 5 decreases, so that such air flows vertically along the lateral wall 10a of the first combustion chamber 7. Consequently, swirl flow is produced near the projection 12 and squish flow is produced near the lateral wall 10a of the combustion chamber 7. Pressure of the fuel fed into the fuel chamber 29 is governed by a fuel pump (not shown) which is synchronizedly driven by the engine 3. Specifically, when a fuel transfer rate of the fuel pump is low, the pressure in the fuel chamber 29 is low, and when the fuel transfer rate is high, the pressure becomes high. Start timing of fuel transfer of the fuel pump is determined such that the pressure in the fuel chamber 29 reaches the value $P_1$ and the first nozzle holes 30 open just prior to the top dead center of the piston 5. Thus, the fuel is injected toward the lateral wall 10a of the first combustion chamber 7 before the top dead center of the piston 5. This fuel is vaporized with high temperature air in the first combustion chamber 7 and at the same time this fuel is mixed with the swirl and squish flows so that the fuel is mixed with the air well and distributed near the projection 12 as well as the lateral wall 10a of the first combustion chamber 7. Some fuel is self-ignited with the high temperature air and so-called initial combustion takes place before the flame gradually propagates to remaining fuel. The combustion process after the initial combustion process is generally called the diffuse combustion process.

The second nozzle hole 32 is closed until the diffuse combustion starts in the first combustion chamber 7. The second nozzle hole 32 is closed by the third stem 31 of the needle valve 21. When the fuel pressure in the fuel chamber 29 exceeds the value $P_2$, the second return spring 43 is moved upward and then the second nozzle hole 32 is opened with the first nozzle holes 31 being opened. Consequently, the fuel is also introduced to the second combustion chamber 13. At this time, the projection 12 is already heated by the flame built in the first combustion chamber 7. Thus, the interior of the second combustion chamber 13 is also heated. As a result, the fuel injected into the small volume chamber 13 is burned instantaneously and the gases produced upon the combustion go out of the second combustion chamber 13 throught the combustion gas exit opening 15. This combustion gas enters the first combustion chamber 7 when the combustion in the first combustion chamber 7 has proceeded somewhat, and makes turbulence of the flame, remaining air and fuel and soot produced upon the combustion in the first combustion chamber 7. The swirl and squish flows produced in the first combustion chamber 7 are gradually weakened, but the combustion gas in the second combustion chamber 13 flows into the first combustion chamber 7 before the swirl and squish flows are attenuated. Accordingly, the turbulence of the first combustion chamber 7 is maintained through the combustion process in the first combustio chamber 7 by the swirl and squish flows during an approximate first half (generally referred to as "initial combustion period") of the combustion process and by the gases from the second combustion chamber 13 during an approximate second half (generally referred to as "diffuse combustion period"). Therefore, the soot is burned almost completely and a less amount of smoke (mainly soot) is discharged from the engine.

Here, it should be noted that the present invention is not limited to the above-described embodiment. For example, the combustion gas exit openings 15 extends in the horizontal direction in the embodiment, but they may extend in other directions such as in the tangential direction of the sphere 49 of the projection 12. In addition, in the above-described embodiment, the fuel is injected into the second combustion chamber 13 after the diffuse combustion starts in the first combustion chamber 7. However, the fuel may be injected to the second combustion chamber 13 before the diffuse combustion starts in the first combustion chamber 7 or injected at the time of starting of the diffuse combustion as long as the turbulence in the first combustion chamber 7 is maintained throughout the combustion process in the first combustion chamber 7. If the fuel is injected to the second combustion chamber 13 before the diffuse combustion starts in the first combustion chamber 7, the turbulence in the first combustion chamber 7 during the initial combustion process is maintained by not only the swirl flow and the squish flow but also the gases coming into the first combustion chamber 7 from the second combustion chamber 13.

We claim:

1. A diesel engine comprising:
   a first combustion chamber formed in a top portion of a piston of the engine, the piston having an axial direction, the first combustion chamber having a bottom and a lateral wall;
   a projection formed on the bottom of the first combustion chamber, the projection having a top and a side;
   a second combustion chamber formed in the projection;
   a fuel introduction opening formed in the top of the projection, the introduction opening communicating with the second combustion chamber;
   combustion gas exit openings formed in the side of the projection, the second combustion chamber communicating with the first combustion chamber by the exit openings; and
   fuel injection nozzle means having first nozzle holes and a second nozzle hole, the first nozzle holes being directed to the lateral wall of the first combustion chamber and the second nozzle hole being directed to the second combustion chamber through the fuel introduction opening, such that fuel is only injected to the first combustion chamber from the first nozzle holes during a predetermined period of time, and fuel is injected to the first and second combustion chambers respectively from the first and second nozzle holes after the predetermined period of time.

2. The diesel engine of claim 1, wherein the first combustion chamber is truncated conical in cross section in the axial direction of the piston.

3. The diesel engine of claim 1, wherein the projection includes a cylindrical base and a sphere integrally formed on the base, and the second combustion chamber is defined by a spherical vacant space formed in the sphere.

4. The diesel engine of claim 3, wherein a diameter of a cylindrical portion of the base is smaller than a diameter of the sphere.

5. The diesel engine of claim 1, wherein a center of the fuel introduction opening coincides with the axial direction of the piston and the fuel from the second nozzle hole flows in the axial direction of the piston.

6. The diesel engine of claim 3, wherein the combustion gas exit openings are formed in the side of the sphere at intervals.

7. The diesel engine of claim 1, wherein the combustion gas exit openings extend substantially parallel to the bottom of the first combustion chamber.

8. The diesel engine of claim 1, wherein the fuel is injected to the second combustion chamber after a diffuse combustion process starts in the first combustion chamber.

9. The diesel engine of claim 1, wherein the fuel is injected to the second combustion chamber before a diffuse combustion process starts in the first combustion chamber.

10. The diesel engine of claim 1, wherein the fuel injection nozzle means includes a multi-hole pintaux nozzle and two-stage-opening nozzle holder such that the first nozzle holes are opened as a pressure in a fuel chamber of the nozzle means reaches a first predetermined value and the second nozzle hole is also opened as the pressure reaches a second predetermined value.

11. The diesel engine of claim 3, wherein the combustion gas exit openings extend in a tangential direction of the sphere.

* * * * *